US012041865B1

(12) United States Patent
Zelenka

(10) Patent No.: US 12,041,865 B1
(45) Date of Patent: Jul. 23, 2024

(54) SHOVEL FOR DEBRIS REMOVAL

(71) Applicant: John Zelenka, Towaco, NJ (US)

(72) Inventor: John Zelenka, Towaco, NJ (US)

( * ) Notice: Subject to any disclaimer, the term of this patent is extended or adjusted under 35 U.S.C. 154(b) by 794 days.

(21) Appl. No.: 17/084,908

(22) Filed: Oct. 30, 2020

Related U.S. Application Data

(60) Provisional application No. 62/928,573, filed on Oct. 31, 2019.

(51) Int. Cl.
*A01B 1/02* (2006.01)
*A01B 1/22* (2006.01)

(52) U.S. Cl.
CPC . *A01B 1/02* (2013.01); *A01B 1/22* (2013.01)

(58) Field of Classification Search
CPC .. E01H 5/02; E01H 5/06; E01H 5/061; B25G 3/00; B25G 3/02
USPC ......................................................... 172/371
See application file for complete search history.

(56) References Cited

U.S. PATENT DOCUMENTS

| 1,365,453 | A | * | 1/1921 | Burroughs | ............... | B25G 3/02 |
| | | | | | | 279/97 |
| 1,423,775 | A | * | 7/1922 | Mundt | ...................... | A01B 1/22 |
| | | | | | | 294/60 |
| 2,333,371 | A | * | 11/1943 | Graham | .................... | A01B 1/22 |
| | | | | | | 172/194 |
| 4,280,727 | A | * | 7/1981 | Germain | ................... | E01H 5/02 |
| | | | | | | 294/54.5 |
| D298,205 | S | * | 10/1988 | Pollak | .............................. | D8/10 |
| D395,211 | S | * | 6/1998 | Linden | ............. | D8/10 |
| 5,826,930 | A | * | 10/1998 | Whitehead | ............... | E01H 5/02 |
| | | | | | | 294/54.5 |
| 5,983,504 | A | * | 11/1999 | Tisbo | ...................... | B25G 3/26 |
| | | | | | | 294/54.5 |
| 7,156,435 | B1 | * | 1/2007 | Mourelatos | ............... | E01H 5/02 |
| | | | | | | 294/54.5 |
| 10,259,113 | B2 | * | 4/2019 | Mackin | ..................... | B25G 3/34 |
| 10,822,757 | B2 | * | 11/2020 | Pavey | ..................... | E01H 5/061 |
| 2016/0345721 | A1 | * | 12/2016 | Ortiz | ...................... | B44D 3/123 |

* cited by examiner

*Primary Examiner* — Thomas B Will
*Assistant Examiner* — Audrey L Lusk
(74) *Attorney, Agent, or Firm* — Lawrence G. Fridman, Esq.; FEIGIN & FRIDMAN, LLC

(57) ABSTRACT

A shovel is provided having a handle, a support assembly and a blade. The support assembly comprises a substantially flat mounting base adapted for connection to the blade and having first and second ends and front and rear regions. A shaft positioned at first angle to the base. First and second arms symmetrically arranged with respect to the shaft. The first arm connects the first end of the base with a central region of the shaft, and the second connects the second end of the base with a central region of the shaft. The shaft is formed with a hollow channel with a reinforcing rod disposed within the channel.

10 Claims, 8 Drawing Sheets

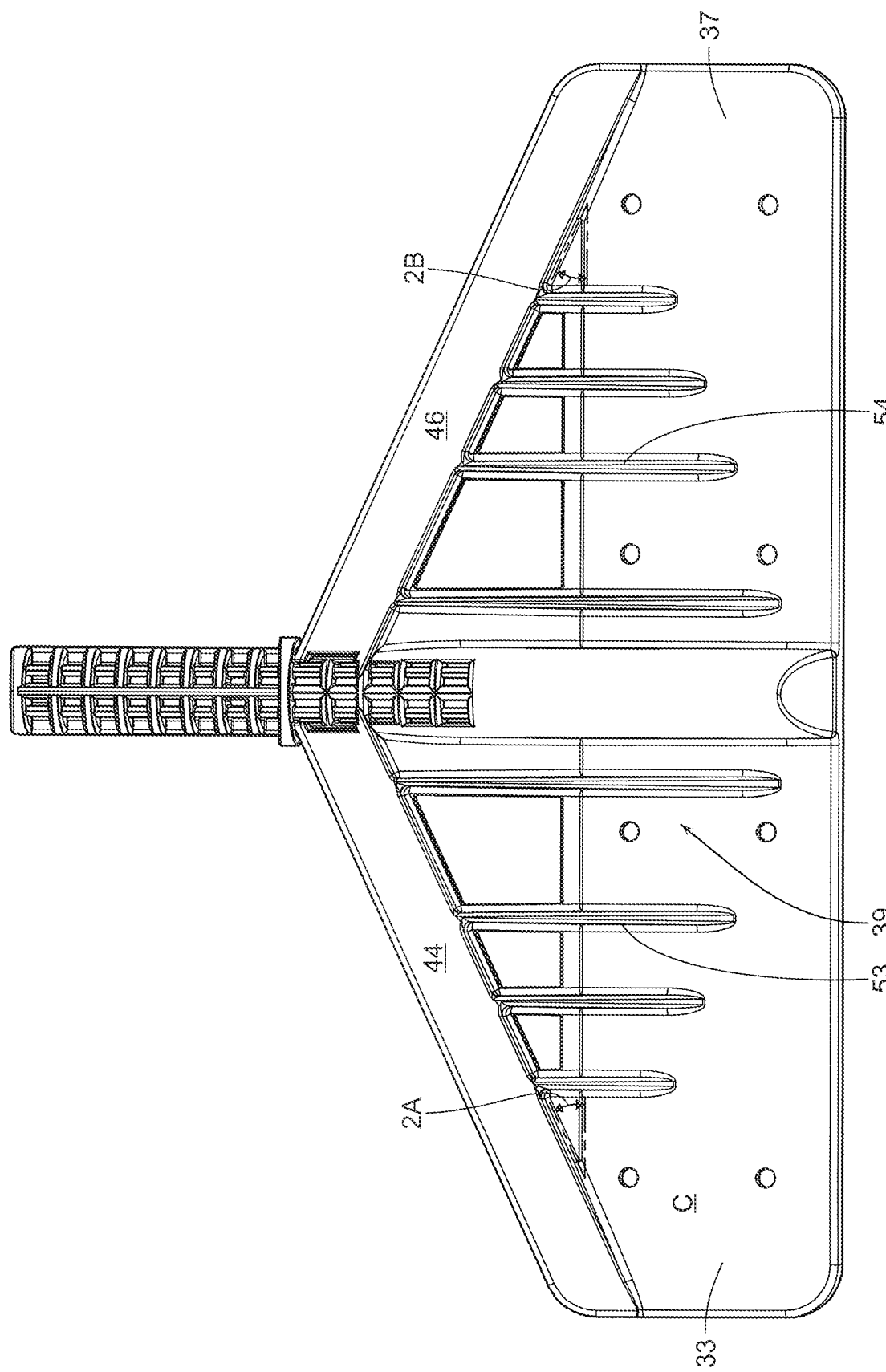

SHOVEL FOR DEBRIS REMOVAL

CROSS-REFERENCE TO RELATED APPLICATION

This application claims priority of Provisional Patent Application Ser. No. 62/928,573 filed by the applicant Oct. 31, 2019, the entire content of which is hereby incorporated by reference.

FIELD OF THE INVENTION

The invention relates in general to shovels, and more particular to shovels useful for debris removal.

BACKGROUND OF THE INVENTION

The present invention relates generally to tools and, more specifically, to a shovel designed for moving debris longitudinally while the shovel also moves longitudinally. Thus, the need for lifting the shovel during debris removal is minimized. There are known in the prior art to make advanced shovels which can be made of various expensive materials, such as alloys some of which may be aluminum, titanium, or carbon fiber. Many different means of attaching blades to the shovel assembly are known from the prior art, such as welding, brazing, soldering, molding, or pressing fittings together, etc. may also be incorporated into the design.

Thus, it has been long felt and unsolved need for an inexpensive shovel useful for various debris removal which can be easily assembled and disassembled by a user without use of tools.

SUMMARY OF THE INVENTION

For purposes of this description, the terms "upper," "bottom," "right," "left," "front," "vertical," "horizontal," and derivatives thereof shall relate to the invention as oriented in figures of the drawing.

As to a further description of the manner and use of different embodiments of the present invention, the same should be apparent from the above description. Accordingly, no further discussion relating to the manner of usage and operation of the embodiments different from that discussed below will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the description above contains many specifications, these should not be construed as limiting the scope of the invention but as merely providing illustrations of some of the presently preferred embodiments of this invention. Thus, the scope of the invention should be determined by the appended claims and their legal equivalents, rather than by the examples given.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

One aspect of the invention provides a shovel for debris removal which is formed with a handle, a support assembly and a blade. The support assembly is interposed between the handle and the blade and comprises a flat mounting base for connection to the blade. The base has first and second ends and longitudinally extending front and rear regions. A connecting shaft extends between proximal and distal areas, wherein the proximal area is adapted for connection to the handle and the distal area is adapted for connection to the base. The front region of the base is connected to the blade. The shaft is positioned at an angle to the base. First and second arms symmetrically arranged with respect to the shaft. The first arm is positioned at an angle to the base and connects the first end of the base with a central region of the shaft. The second arm is positioned at an angle the base and connects the second end of the base with a central region of the shaft. The shaft is formed with a hollow channel extending along a longitudinal axis of the shaft, a reinforcing rod disposed within the channel. The handle has first and second ends, wherein the first end is adapted for connection to said shaft and the second end utilized by a user to permit the blade to be pushed by a user while gripping the handle. A locking assembly is disposed at a hollow area of the first end of the pole/handle and includes a resilient element provided at first end of the handle. An engaging pin extends from the resilient element, so as to be pushed in and out an aperture passing through the first end. In the working position the proximal end of the shaft is disposed within the hollow area of the pole/handle, so that the pin engages the socket in the shaft locking the handle on the supporting assembly, wherein to remove the handle from the supporting assembly the resilient element is lifted to disengage the pin from the socket/receiving recess.

Another aspect of the invention provides a locking assembly for removable connection between the handle and the shaft of the support assembly. The locking assembly includes a hollow sleeve extending from the first end, a resilient element provided at first end with an outwardly extending engaging pin. In use the pin is pushed in and out of an aperture passing through the first end into the hollow space, so that the pin engages a socket in the shaft locking the handle on the support assembly, to remove the handle from the support assembly the resilient element is lifted to disengage the pin from its engagement with the socket of the shaft.

A further aspect of the invention provides a pair of pole storage hooks extending from a rear side of the support assembly, each storage hook is formed having a curved recess. The storage hooks are separated by the shaft, in the assembled condition while the support assembly is attached to the blade the handle is stowed between the rear side of the support assembly and the blade with the exterior of the handle engaging the curved recesses of the storage hooks.

BRIEF DESCRIPTION OF THE DRAWINGS

In the drawings, the same parts in the various views are afforded the same reference designators. Referring now to the drawings which are provided to illustrate and not to limit the invention, wherein:

FIGS. 4 and 4A are the views of the support assembly showing a reinforcement rod;

FIG. 8 is a top view of the support assembly.

DETAILED DESCRIPTION OF THE INVENTION

Figure 1:
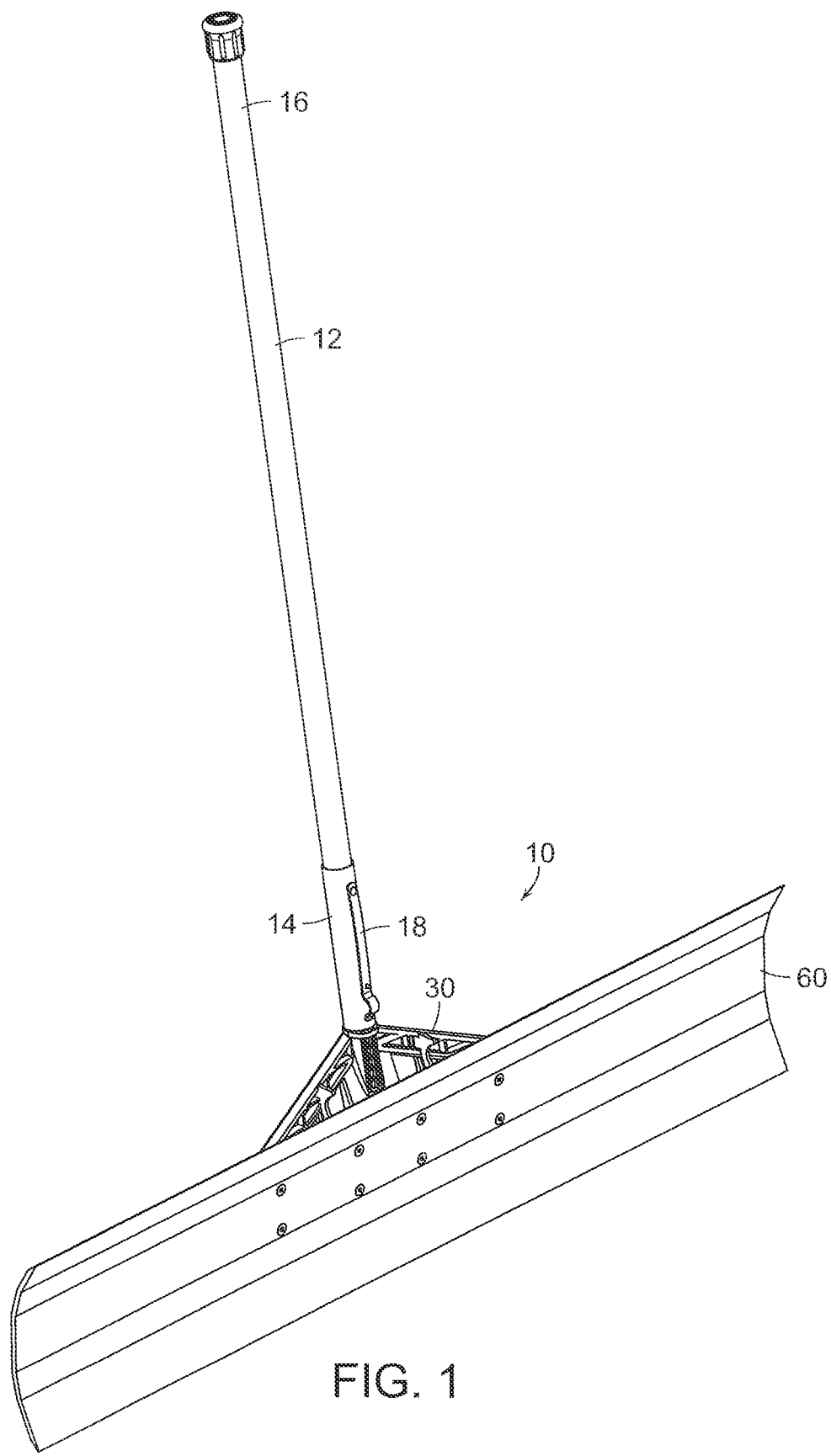
FIG. 1 is an assembled view of the debris removal shovel according to a preferred embodiment of the invention.

The shovel assembly 10 of the invention is designed for the removal of various types of debris and enables the user to move the debris along a surface to be cleaned instead of physically lifting them. In one embodiment the shovel assembly of the invention can be manufactured from a lightweight polymeric material having minimal deformation under load, a property normally associated with metals. This property is further substantially improved by providing reinforced members in the critical areas of the device such as a shaft forming a part of a support assembly. On the other hand, use of many conventional materials other than polymers is within the scope of the invention.

Referring now to the drawings in general and more particular to FIGS. 1-8 illustrating a shovel assembly 10 for debris removal according to the preferred embodiment of the invention. Among the essential elements of the shovel are a handle 12 in the form of a pole, a blade 60 and a support assembly 30 providing a connection between the handle and the blade.

Figure 2:
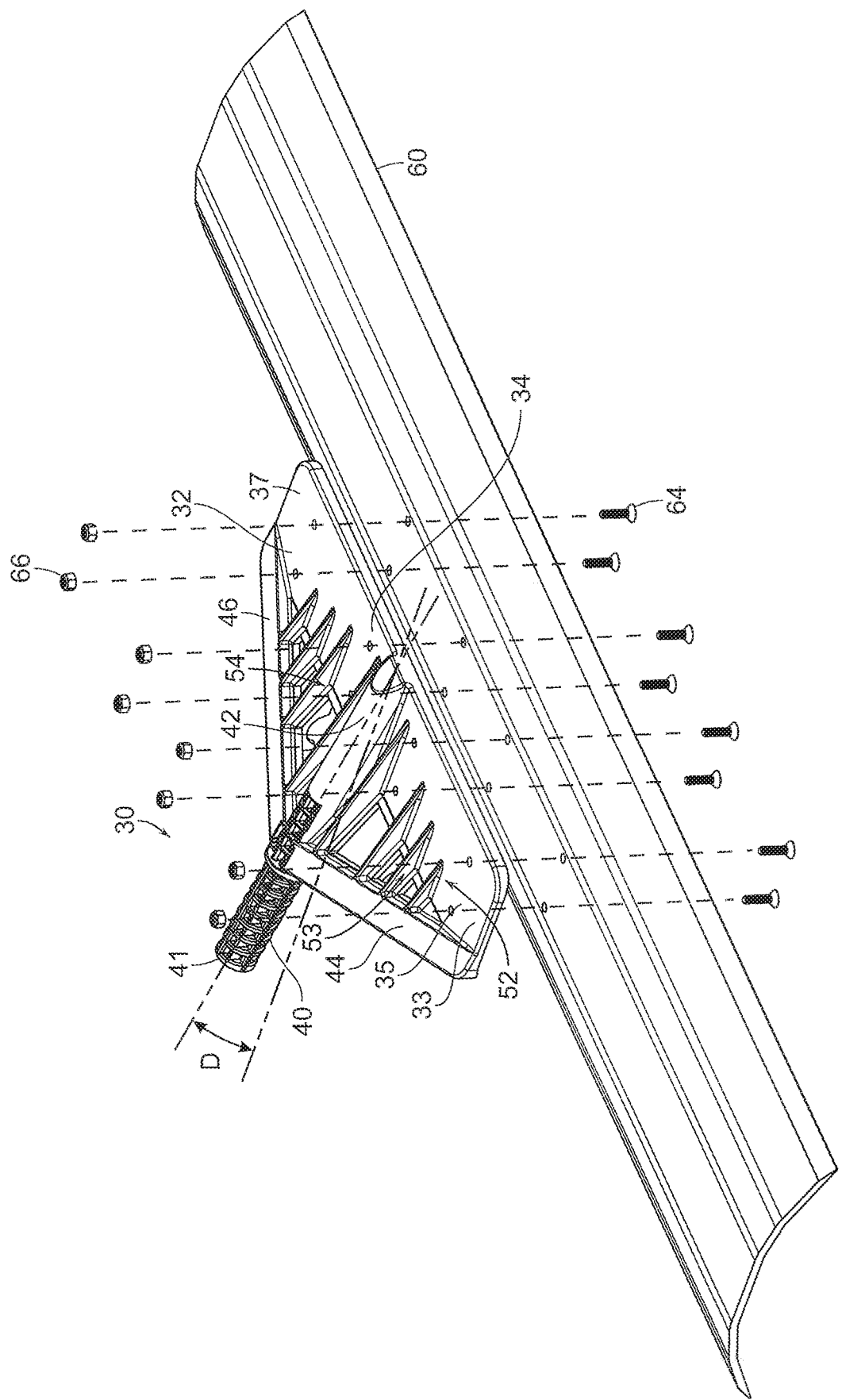
FIG. 2 is an exploded view showing a support assembly being separated from the blade.
Figure 3:
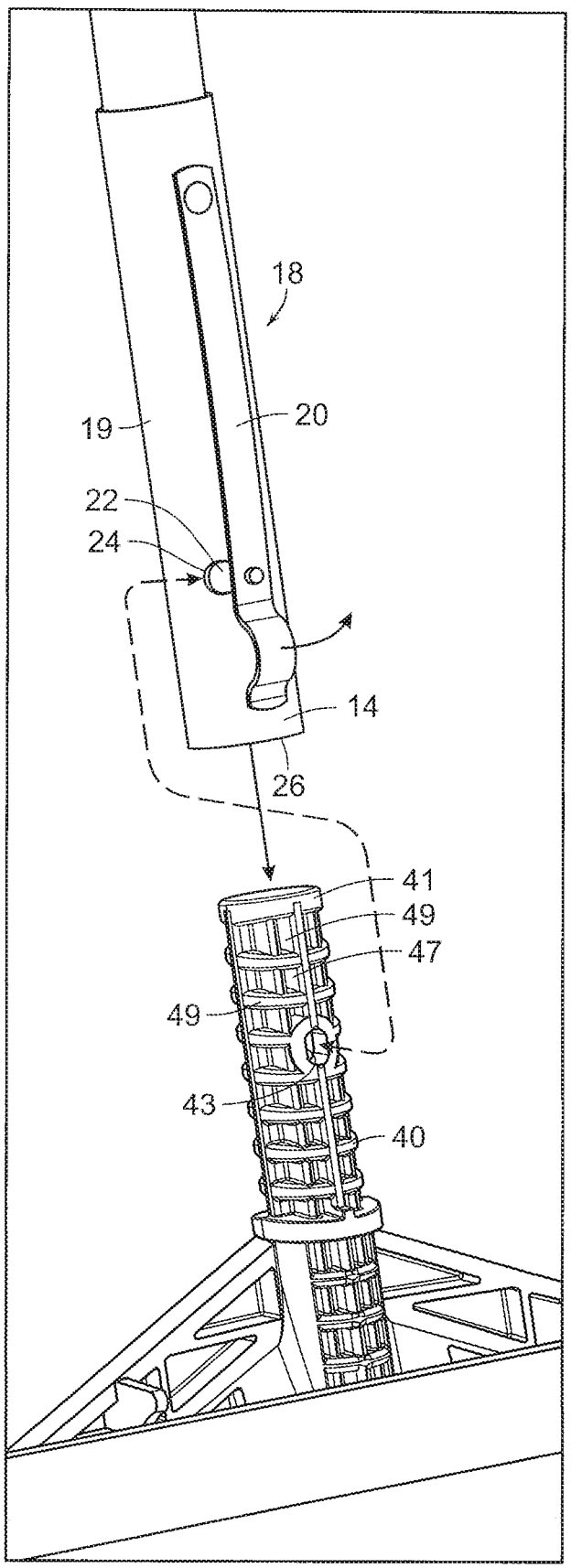
FIG. 3 is a view illustrating an engaging assembly of the invention.
Figure 4:
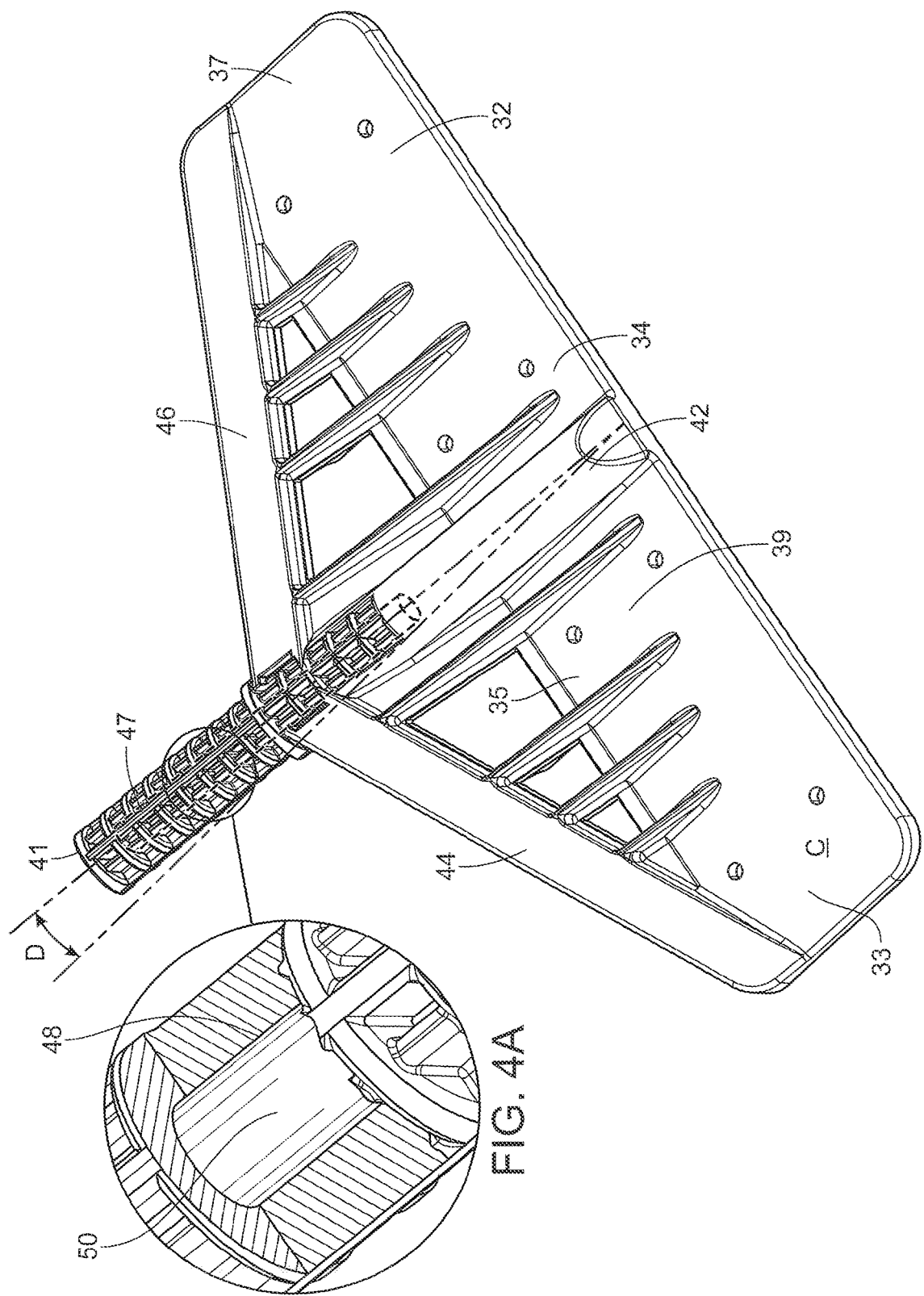

The handle 12 is typically in the form of an elongated pole enabling the shovel to be operated by a user. Other configurations of the handle are also within the scope of the invention. The handle extends between first 14 and second 16 ends, wherein the first end is adapted for connection to a shaft 40 of the support assembly 30 and the second end is utilized by a user to permit the blade to be pushed while the handle is gripped by the user. As best illustrated in FIG. 3 the first end 14 is hollow to accommodate a locking assembly 18 for removable connection between the handle and the shaft of the support assembly. In the illustrated embodiment the locking assembly includes a sleeve 19 formed with hollow inner space 26 extending from the first end 14. However, an integral hollow part of the first end of the handle is also contemplated. The locking assembly 18 further comprises a resilient element 20 provided at the first end 14 with an engaging pin 22 extending outwardly therefrom. In use the pin 22 is pushed in and out of an aperture 24 passing through the first end into the hollow space 26. In the engaged working position, a proximal end of the shaft 40 of the support assembly is disposed within the hollow space 26. Further, the pin 22 engages a socket/receiving recess 43 in the shaft locking the handle 12 on the support assembly 30. To remove the handle 12 from the support assembly 30 the resilient element 20 is lifted to disengage the pin 22 from its engagement with the socket/receiving recess 43 of the shaft Turning now to FIGS. 2,4,6 and 8 illustrating in more detail the support assembly 30 providing connection between the handle and the blade. The support assembly 30 consists of a substantially planner mounting base 32 adapted for connection to the blade 60. The base 32 extends between first 33 and second 37 ends in a lateral direction as well as between front 34 and rear 35 regions in a longitudinal direction. The connecting shaft 40 extends between its proximal 41 and distal 42 areas. The proximal area is adapted for insertion into the hollow space 26 of the sleeve 19 of the handle 12. The distal area 42 is connected to the base 32, ultimately enabling the blade to be pushed by a user while gripping the handle. An attachment part 39 of the base between the front 34 and rear 35 regions is adapted for connection to the blade 60. First 44 and second 46 arms extend between the first 33 and second 37 ends at a lower elevation to be connected and symmetrically arranged with respect to the shaft 40 at a higher elevation. As best illustrated in at least FIG. 8, the first arm 44 positioned at an angle 2A in a horizontal plane C to the base 32 to connect the first end 33 of the base with a central region of the shaft 40. The second arm 46 is positioned at an angle 2B in the horizontal plane C to the base 32 to connect the second end 37 of the base with a central region of the shaft. As best illustrated in FIGS. 2 and 4, the shaft 40 is positioned at an angle D in a vertical plane regarding the base 32. Through their connection to the shaft 40, the arms 44 and 46 also extend at an appropriate angle to the base 32 in the vertical plane. It will be discussed later in the application that to solidify the composite angular relationship between the arms 44,46 and the base 32 multiple, spaced apart stiffening reinforcing ribs extend between the arms and the base.

As best illustrated in FIG. 4, the shaft 40 is formed with a hollow internal channel 48 extending along its longitudinal axis. To reinforce the structure of the shaft a reinforcing element or a rod 50 is disposed within the channel 48 to enable the shaft to withstand tortuous and bending moments generated during the use of the shovel of the invention. In one embodiment the reinforcement element or rod 50 forms an integral part of the shaft and/or support assembly. In a modified embodiment the channel 48 extends substantially through the entire central region of the shaft 40 and the rod 50 can be inserted into and removed from the channel as needed.

As best illustrated in FIGS. 2-8 an exterior of the shaft 40 is formed with a plurality of reinforcement latitudinal and longitudinal members 49 developing multiplicity of cells/meshes 47. The semi-hollow cells 47 penetrate the material of the shaft exterior substantially reducing its weight.

The proximal area 41 of the shaft extends outwardly from the support assembly in general, and more specifically it extends outwardly from an area of projected intersection between the first arm 44 and the second arm 46. The distal area 42 of the shaft is integral with and extends from the front and central regions of the mounting base 32.

As best illustrated in FIG. 2 reinforcement mounting structure 52 connects the first 44 and second 46 arms with the mounting base 32. The reinforcement mounting structure 52 comprises first 53 and second 54 groups of spaced from each other reinforcing ribs. The first group of ribs 53 connects the attachment part 39 of the mounting base 32 to the first arm 44, whereas the second group of ribs 54 connects the attachment part 39 to the second arm 46.

Figure 6:
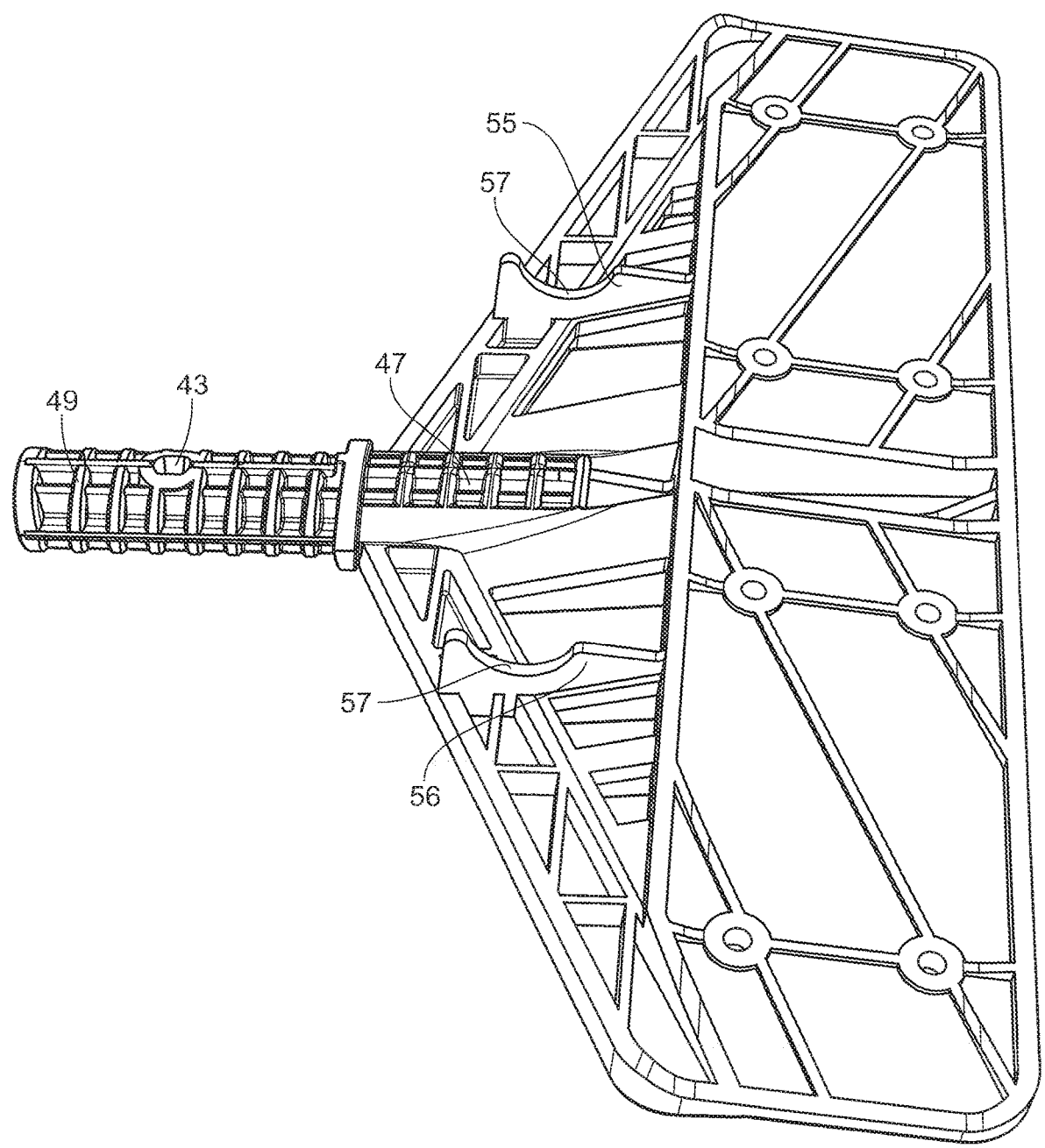
FIG. 6 is a bottom view of the support assembly.

As illustrated in FIGS. 2, 6 and 8 in the preferred embodiment the mounting base 32 is formed with multiple holes 62 and multiple fasteners 64 and nuts 66 are provided for connection of the base to the blade 60. To assemble the shovel the, fasteners pass through the holes in the base to threadably engage the nuts and to provide connection between the support assembly and the blade. It should be also noted that any other conventional way of connecting the base and the blade is contemplated by the invention.

Figure 5:
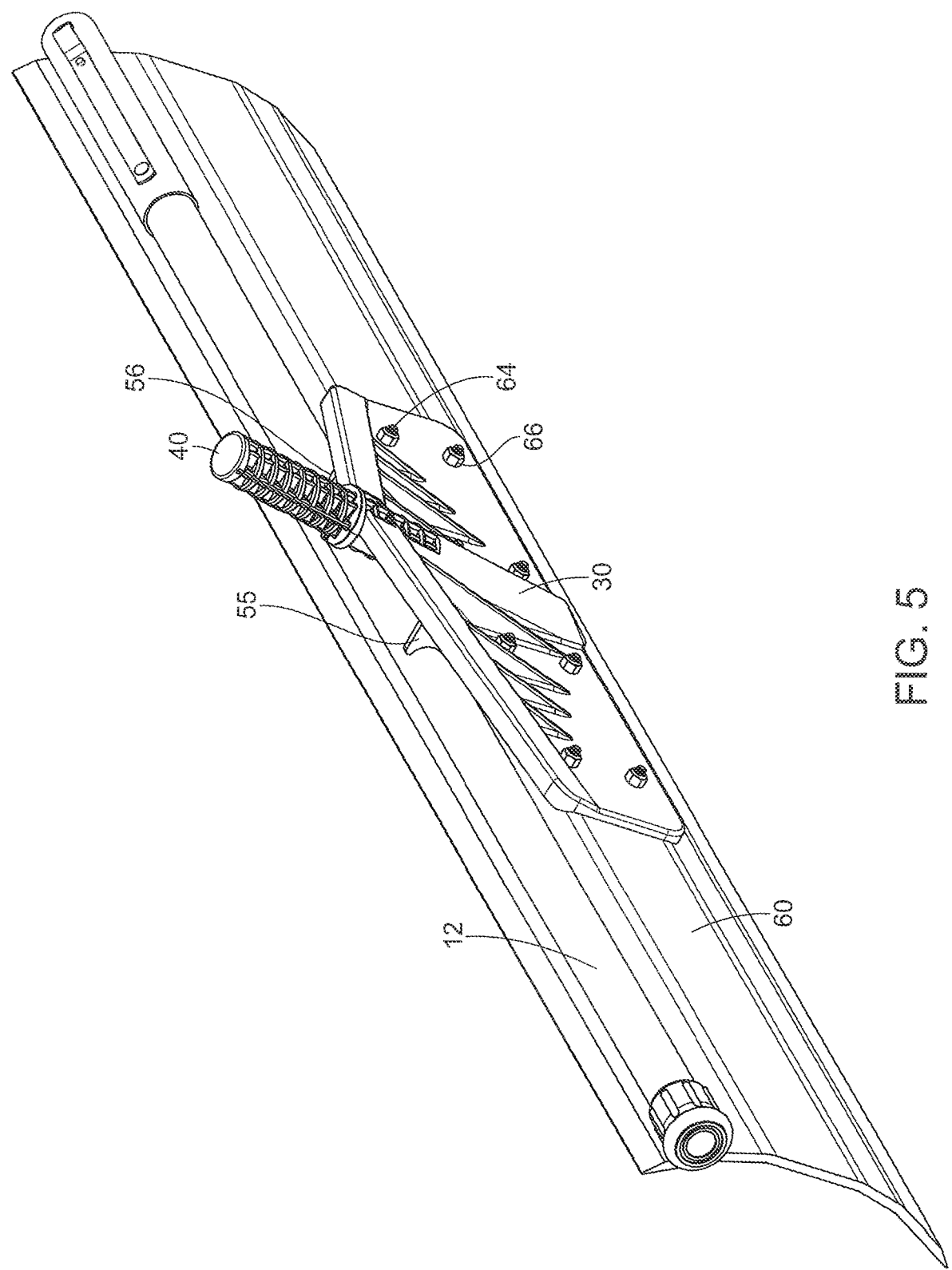
FIG. 5 is a view showing the handle stowed within the support assembly.
Figure 7:
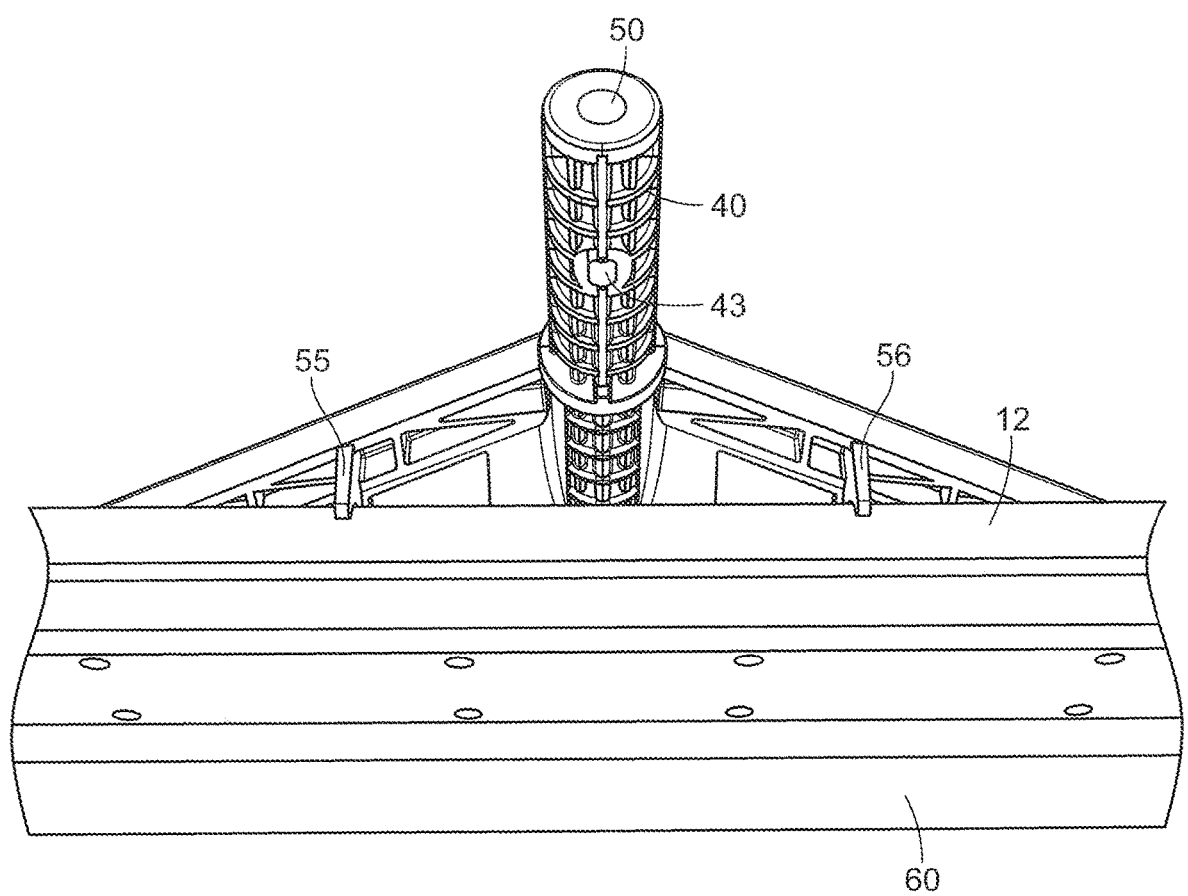
FIG. 7 is another view showing the handle stowed within the support assembly.

As illustrated in FIGS. 5-7 a pair of pole storage hooks 55 and 56 are provided at and extend from a rear side of the mounting base 32 and are separated by the shaft 40. Each storage hook is formed having a curved recess 57. In a disassembled condition of the shovel 10, while the support assembly 30 is attached to the blade 60, the pole/handle 12 is stowed between the rear side of the support assembly and the blade, with the exterior of the pole 12 firmly engaging the curved recesses 57 of the storage hooks. This connection is reliable to the extent that the entire shovel can be lifted by a user using the handle shoved as discussed above between the support assembly and the blade.

Thus, it has been demonstrated above that the invention provides simple, economical shovel assembly very useful for many types of debris removal, the shovel which can be easily assembled and disassembled by a user without use of any sophisticated tools. An essential aspect of the invention is that it enables the user to move the debris along a surface to be cleaned instead of physically lifting them. Beneficially the shovel assembly of the invention is typically manufactured from a lightweight polymeric material having minimal deformation under load, a property normally associated with metals and other expensive materials. Reliability of the invention is improved by providing the reinforced metal inserts in the critical areas of the device such as a shaft forming a part of a support assembly.

What is claimed is:

1. A shovel for debris removal comprising:
    a handle, a unitary support assembly and a blade;
    the unitary support assembly interposed between said handle and said blade comprises a substantially flat mounting base having a rear region connected to the blade and a front region facing an exterior of the shovel, said base having first and second ends;
    a connecting shaft extending outwardly from said front region of the base between proximal and distal areas with said proximal area connected to said handle and said distal area connected to said front region of the base; said shaft formed with a hollow channel extending along a longitudinal axis thereof, a reinforcing rod slidably disposed within the channel;
    said shaft positioned at a first angle in a vertical direction to a plane of to the base, first and second arms symmetrically arranged with respect to the shaft, the first arm positioned at a second angle to the plane of the base and connecting the first end of the base with a central region of the shaft, the second arm positioned at said second angle to the plane of the base and connecting the second end of the base with a central region of the shaft, with said base and said first and second arms being disposed at different elevations, multiple spaced from each other stiffening ribs extending between said first and second arms and said front region of the mounting base forming open spaces therebetween; and
    a pair of spaced from each other storage hooks each provided between the rear region of the substantially flat mounting base and the respective first and second arms separated by the shaft, each said storage hook having an unobstructed curved recess;
    further comprising a locking assembly for removable connection between the handle and the shaft of the unitary support assembly;
    wherein the locking assembly comprising a hollow sleeve extending from the first end of the handle, a resilient element having an outwardly extending engaging pin provided at an exterior of the sleeve;
    wherein in a disassembled condition of the shovel while the handle is inserted through the unobstructed curved recess to be retained between said rear side of the unitary support assembly and the blade, with an exterior of the handle engaging the curved recesses and having a substantial part of the handle exterior extending outwardly from said unobstructed curved recess, so that that the entire shovel can be lifted by a user utilizing the handle.

2. A shovel according to claim 1, wherein the mounting base is formed with multiple holes and multiple fasteners and nuts are provided for connection of the mounting base to the blade, so that to assemble the shovel the fasteners pass through the holes in the base to engage the nuts to provide connection between the unitary support assembly and the blade.

3. A shovel according to claim 1, wherein said shaft formed with a plurality of reinforcement latitudinal and longitudinal members intersecting each other to form multiplicity of semi-hollow cells penetrating through a body the shaft exterior.

4. A shovel according to claim 1, further comprising a reinforcement mounting structure comprising first and second groups of spaced from each other reinforcing ribs, said first group of ribs connecting a middle area of the mounting plate to the first arm, said second groups of ribs connecting the middle area of the mounting plate to the second arm.

5. A shovel according to claim 1, wherein said unitary support assembly is made from a lightweight polymeric material having minimal deformation under load.

6. A shovel according to claim 1, wherein said blade is formed having arch shaped configuration, said blade is made from a lightweight polymeric material having minimal deformation under load.

7. A shovel according to claim 1, wherein said mounting base having a bottom edge aligned with a top edge of said blade, said distal end of the shaft attached to a top edge of said mounting plate so that said shaft along with said plate extends tangentially away from said blade aligned with the bottom edge of said blade.

8. A shovel according to claim 1, wherein in the working position the proximal end of the shaft is disposed within the hollow area of the sleeve, with the pin engaging a receiving recess in the shaft to lock the handle on the supporting assembly, wherein to remove the handle from the supporting assembly the resilient element is lifted to disengage the pin from the receiving recess.

9. A shovel according to claim 1, wherein said open spaces extend between said front region of the mounting base and the respective arms.

10. A shovel according to claim 1, wherein in the unitary support assembly the substantially flat mounting base is directly connected to the blade without any intermediate elements.

* * * * *